US006501607B2

(12) United States Patent
Keirn et al.

(10) Patent No.: US 6,501,607 B2
(45) Date of Patent: Dec. 31, 2002

(54) CHANNEL QUALITY MONITOR (CQM) FOR DIGITAL PEAK DETECTION (DPD)

(75) Inventors: Zachary A. Keirn, Loveland, CO (US); Daniel D. Woods, Longmont, CO (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/757,840

(22) Filed: Jan. 10, 2001

(65) Prior Publication Data

US 2002/0089770 A1 Jul. 11, 2002

(51) Int. Cl.[7] ............................................. G11B 27/36
(52) U.S. Cl. ............................. 360/31; 360/53; 360/45; 360/46; 360/51; 360/25
(58) Field of Search ............................. 360/53, 45, 46, 360/31, 51, 25; 714/704, 706, 769, 770; 369/53.1, 53.41, 53.42, 53.44

(56) References Cited

U.S. PATENT DOCUMENTS 5,627,846 A * 5/1997 Carr ............................. 360/46
6,100,829 A    8/2000 Fredrickson et al.

OTHER PUBLICATIONS

"Effect of Bitshift Distribution on Error Rate in Magnetic Recording", IEEE Transactions on Magnetics, vol. MAG–15, No. 3, May, 1979, 4 pp.

"Adaptive Equalization in Magnetic–Disk Storage Channels", IEEE Communications Magazine, Feb., 1990, pp. 14–29.

\* cited by examiner

*Primary Examiner*—Alan T Faber
(74) *Attorney, Agent, or Firm*—W. Daniel Swayze, Jr.; W. James Brady; Frederick J. Telecky, Jr.

(57) ABSTRACT

The present invention relates to a method of providing error margin information for threshold errors associated with a digital peak detector. The method comprises comparing a plurality of peak sample values associated with the digital peak detector to a threshold margin test level and incrementing a counter each time the threshold margin test level exceeds one of the plurality of peak sample values. The value associated with the counter relates to an amount of threshold margin associated with the digital peak detector. The present invention also relates to a method of providing error margin information for peak shift errors associated with a digital peak detector. The method comprises identifying relevant peak sample data points associated with each of a plurality of detected peaks and determining a peak shift amplitude associated with each of the detected peaks using the identified relevant peak sample data points. The method further comprises comparing the peak shift amplitudes associated with the detected peak to a peak shift test level and incrementing a counter each time the peak shift amplitudes associated with the detected peaks exceed the peak shift test level. The value associated with the counter relates to an amount of peak shift margin associated with the digital peak detector.

34 Claims, 8 Drawing Sheets

CHANNEL QUALITY MONITOR (CQM) FOR DIGITAL PEAK DETECTION (DPD)

FIELD OF THE INVENTION

The present invention relates in general to the field of mass storage devices, and more particularly to a system and method of providing error margin information for threshold errors and peak shift errors, respectively, in read channel circuits.

BACKGROUND OF THE INVENTION

Hard disk drives such as the exemplary drive 10 illustrated in FIG. 1 include a stack of magnetically coated platters 12 that are used for storing information. The magnetically coated platters 12 are mounted together in a stacked position through a spindle 14 which may be referred to as a platter stack. The platter stack is typically rotated by a motor that is referred to as a spindle motor or a servo motor (not shown). A space is provided between each platter to allow an arm 18 having a read/write head or slider 20 associated therewith to be positioned on each side of each platter 12 so that information may be stored and retrieved. Information is stored on each side of each platter 12 and is generally organized into sectors, tracks, zones, and cylinders.

Each of the read/write heads or sliders 20 are mounted to one end of the dedicated suspension arm 18 so that each of the read/write heads may be positioned as desired. The opposite end of each of the suspension arms 18 are coupled together at a voice coil motor 16 (VCM) to form one unit or assembly (often referred to as a head stack assembly) that is positionable by the voice coil motor. Each of the suspension arms 18 are provided in a fixed position relative to each other. The voice coil motor 16 positions all the suspension arms 18 so that the active read/write head 20 is properly positioned for reading or writing information. The read/write heads 20 may move from at least an inner diameter to an outer diameter of each platter 12 where data is stored. This distance may be referred to as a data stroke.

Hard disk drives also include a variety of electronic circuitry for processing data and for controlling its overall operation. This electronic circuitry may include a preamplifier, a read channel, a write channel, a servo controller, a motor control circuit, a read-only memory (ROM), a random-access memory (RAM), and a variety of disk control circuitry (not shown) to control the operation of the hard disk drive and to properly interface the hard disk drive to a system bus. The preamplifier may contain a read preamplifier and a write preamplifier that is also referred to as a write driver. The preamplifier may be implemented in a single integrated circuit or in separate integrated circuits such as a read preamplifier and a write preamplifier or write driver. The disk control circuitry generally includes a separate microprocessor for executing instructions stored in memory to control the operation and interface of the hard disk drive.

Hard disk drives perform write, read, and servo operations when storing and retrieving data. Generally, a write operation includes receiving data from a system bus and storing the data in the RAM. The microprocessor schedules a series of events to allow the information to be transferred from the RAM to the platters 12 through the write channel. Before the information is transferred, the read/write heads 20 are positioned on the appropriate track and the appropriate sector of the track is located. The data from the RAM is then communicated to the write channel as a digital write signal. The write channel processes the digital write signal and generates an analog write signal. In doing this, the write channel may encode the data so that the data can be more reliably retrieved later. The digital write signal may then be provided to an appropriate read/write head 20 after first being conditioned by the preamplifier. Writing data to the recording medium or platter 12 is typically performed by applying a current to a coil of the head 20 so that a magnetic field is induced in an adjacent magnetically permeable core, with the core transmitting a magnetic signal across a spacing of the disk to magnetize a small pattern or digital bit of the media associated with the disk.

Circuitry associated with a read operation is illustrated in FIG. 2, and designated at reference numeral 30. In a read operation, the appropriate sector to be read is located and data that has been previously written to the platters 12 is detected. The appropriate read/write head 20 (illustrated as a magneto-resistive load 20a in FIG. 2) senses the changes in the magnetic flux and generates a corresponding analog read signal. The analog read signal is provided back to the electronic circuitry where a preamplifier circuit 32 amplifies the analog read signal. The amplified analog read signal is then provided to a read channel circuit 34 where the read channel conditions the signal and detects "zeros" and "ones" from the signal to generate a digital read signal. The read channel may condition the signal by amplifying the signal to an appropriate level using, for example, automatic gain control (AGC) techniques. The read channel may then filter the signal to eliminate unwanted high frequency noise, equalize the channel, perform the data recovery from the signal, and format the digital read signal. The digital read signal is then transferred from the read channel and is stored in the RAM (not shown). The microprocessor may then communicate to the host that data is ready to be transferred.

Each bit of information stored on a disk or platter 12 corresponds to a magnetic transition, and a read head generates electrical signals corresponding to the magnetic transition. A "1" may be used to designated the presence of a magnetic transition, and a "0" to designate the lack of a magnetic transition. The read head generates either a positive or a negative pulse for each magnetic transition depending on the polarity of the transition. Data are read from the disk by processing the pulse transition responses.

The read channel circuit 34 may be implemented using any of a variety of known or available read channels. For example, the read channel 34 may be implemented as an analog peak detection type read channel or as a digital peak detection type of read channel. One conventional analog peak detection method is to differentiate the signal and detect zero crossings of the signal derivative. The signal derivative is zero for local minimums and local maximums. The amplitude of the signal where the derivative is zero is then compared to a threshold level to identify peak samples. Such peak detection methods typically have a sample comparison window two to three samples wide.

A conventional digital peak detection method includes converting the analog samples to digital samples, and then comparing a sample to the previous sample and the subsequent sample. If the sample is greater than the previous and subsequent samples, then the sample is compared with a threshold level. If the sample exceeds the threshold then the sample is identified as a pulse or peak. Similar to the conventional analog peak detection system, such digital methods typically have a peak comparison window that is three samples wide.

Two primary sources of reading error in digital peak detection read channels are threshold errors and peak shift errors. In one type of threshold error, an error occurs when the peak of the pulse falls below the threshold and is not detected. This source of threshold error is often called a "missing bit" error. Another type of threshold error occurs when a peak is falsely identified. This type of threshold error is often referred to an "extra bit" error. A peak shift error is often called a "bit shift error" because the peak (associated with a data bit) is shifted undesirably into the next timing window.

There is a need in the art to provide read channel circuits having improved reliability and therefore there is a need for systems and methods for characterizing such circuit reliability with respect to threshold errors and peak shift errors, respectively.

SUMMARY OF THE INVENTION

The present invention relates to a system and method of providing a channel quality monitor for digital peak detection systems in read channels which will provide a user an indication of how close the read channel is to experiencing threshold type errors and peak shift type errors, respectively. Such an indication thus provides the user with information relating to the reliability of the read channel design.

The present invention relates to a system and method of characterizing the reliability of a read channel circuit with respect to threshold type errors. The invention identifies a peak sample data point and identifies a threshold margin associated therewith, wherein the threshold margin is a difference magnitude between the peak sample data point value and a predetermined threshold setting or margin test level. The difference is then analyzed, for example, by determining whether the difference is positive or negative which indicates whether the peak is above or below the margin test level. If the peak is less than the margin test level, a count is incremented. By performing such an analysis for multiple detected peaks over a range of margin test levels, a count distribution is determined which aids a user in determining the threshold margin of the design and thus how close the read channel circuit is to experiencing threshold type errors.

The present invention also relates to a system and method of characterizing the reliability of a read channel circuit with respect to peak shift type errors. The present invention identifies relevant sample data points which are associated with a detected peak and identifies a peak shift amplitude associated therewith, wherein the peak shift amplitude is a value that relates to an amount of peak shift associated with the detected peak. The peak shift amplitude is then compared to a peak shift test level and a count may be incremented based on the comparison. By performing such an analysis for multiple detected peaks over a range of peak shift test levels, a count distribution is determined which aids a user in determining how close a read channel circuit is to experiencing peak shift type errors.

According to one aspect of the present invention, a method of providing error margin information for threshold errors associated with a digital peak detector is disclosed. The method comprises comparing a plurality of peak sample values associated with a digital peak detector portion of the read channel circuit to a threshold margin test level. The method further comprises incrementing a counter each time the threshold margin test level exceeds one of the plurality of peak sample values, wherein a value associated with the counter relates to an amount of threshold margin associated with the digital peak detector. The method may further comprise altering the threshold margin test level a plurality of times and repeating the steps of comparing the plurality of peak sample values to the various altered threshold margin test levels and incrementing the counter. Such repeating results in a count distribution over the plurality of threshold margin test levels, wherein the count distribution provides an indication of an amount of threshold margin associated with the digital peak detector.

According to another aspect of the present invention, a threshold margin channel quality monitor system is disclosed. The system comprises a digital peak detector system operable to detect peaks associated with a read signal and generate a value associated with a magnitude of the detected peaks. The system further comprises a comparison circuit operable to compare the magnitude of a detected peak from the digital peak detector system with a margin test level value, and output a signal indicative of whether the detected peak magnitude is greater than or less than the margin test level. In addition, the system comprises a counter circuit operable to increment a count associated therewith when the comparison circuit signal indicates that the detected peak level is less than the margin test level, such that the count is indicative of a number of detected peaks having amplitudes less than the margin test level. The system may further comprise a control circuit operable to alter the margin test level one or more times after establishing the count for a predetermined number of sample peaks, thereby generating a count distribution as a function of margin test levels. The count distribution may then be used as an indication of the reliability of a read channel circuit with respect to threshold errors.

According to yet another aspect of the present invention, a method of providing error margin information for peak shift errors associated with a digital peak detector is disclosed. The method comprises identifying relevant peak sample data points associated with each of a plurality of detected peaks and determining a peak shift amplitude associated with each of the detected peaks using the identified relevant peak sample data points. The method further comprises comparing the peak shift amplitudes associated with the detected peak to a peak shift test level and incrementing a counter each time the peak shift amplitudes associated with the detected peaks exceed the peak shift test level. In the above manner a value associated with the counter relates to an amount of peak shift margin associated with the digital peak detector.

According to still another aspect of the present invention, the step of identifying relevant peak sample data points comprises identifying three digital sample data points in which at least two of the data points straddle a peak portion of a detected peak. The peak shift amplitude is then determined by subtracting a value associated with a first of the three data points from a value associated with a third of the three data points. Alternatively, the peak shift amplitude is determined by subtracting a value associated with a second of the three data points from a value associated with a greater value of the first or third of the three data points. In such case, a different analysis proceeds with the comparison, wherein a counter is incremented if the peak shift test margin exceeds the peak shift amplitude.

The above method may further comprise repeating the steps of identifying relevant peak sample data points, determining the peak shift amplitudes, comparing the peak shift amplitudes to the peak shift test level, and incrementing the counter for a plurality of different peak shift test levels. In the above manner a count distribution as a function of peak shift test levels is generated, wherein the count distribution provides an indication of how close a read channel circuit is to experiencing peak shift errors.

According to yet another aspect of the present invention, a peak shift margin channel quality monitor system is disclosed. The system comprises a digital peak detector system operable to detect peaks associated with a read signal and provide a plurality of peak sample data points associated with the detected peaks. The system further comprises a comparison circuit operable to compare a peak shift amplitude, which is a value associated with two of the plurality of peak sample data points of a detected peak from the digital peak detector system which reflects a peak shift associated therewith, with a peak shift test level, and output a signal indicative of whether the detected peak shift is greater or less than the peak shift test level. In addition, the system comprises a counter circuit operable to increment a count associated therewith when the signal indicates that the detected peak shift is greater than the peak shift test level. In this manner, the count is indicative of a number of detected peaks having peak shifts greater than the peak shift test level.

According to still another aspect of the present invention, in the above system the plurality of peak sample data points comprise at least three data points, wherein two of the three data points straddle a detected peak. In such circumstances, the comparison circuit comprises a subtraction circuit operable to calculate a difference between a value associated with a first of the three data points and a value associated with a third of the three data points, wherein the difference represents the peak shift amplitude value of the detected peak. The comparison circuit also comprises a second subtraction circuit operable to subtract the peak shift test level from the difference value associated with the detected peak. Lastly, the comparison circuit comprises a threshold detect circuit operable to generate an indication having a state which is a function of whether a subtraction result of the second subtraction circuit is positive or negative.

Alternatively, in the above system the comparison circuit may comprise a subtraction circuit operable to subtract a value associated with a second data point of the three data points from a value associated with a greater value of the first or third of the three data points to generate a peak shift amplitude associated with the detected peak. In the subsequent comparison using, for example, the subtraction circuit, if the peak shift amplitude is less than the peak shift test level, the counter is incremented.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described with respect to the accompanying drawings in which like numbered elements represent like parts. The present invention is directed to a system and method of characterizing a read channel circuit design regarding reliability with respect to threshold errors and peak shift errors, respectively, associated with a digital peak detector. The present invention takes detected peak data points and generates a peak data characteristic (e.g., a threshold margin or a peak shift amplitude) based on an established metric. The peak data characteristic is then compared to a test level and a count is selectively incremented based on the comparison result. By varying the test level and repeating the analysis a number of times, a count distribution is generated which provides a user an indication of how close the read channel circuit is to experiencing threshold or peak shift type errors, respectively.

Although both threshold and peak shift type errors described supra are the primary source of reading error in digital peak detection type read channel circuits, both are still relatively rare. It is always desirable, however, to further improve reading accuracy. Consequently, it would be desirable to identify error margin data with respect to a digital peak detector portion of a read channel circuit. Accordingly, the present invention is directed to a system and method for identifying and providing error margin information for missing bit threshold errors and peak shift errors, respectively.

Figure 1:
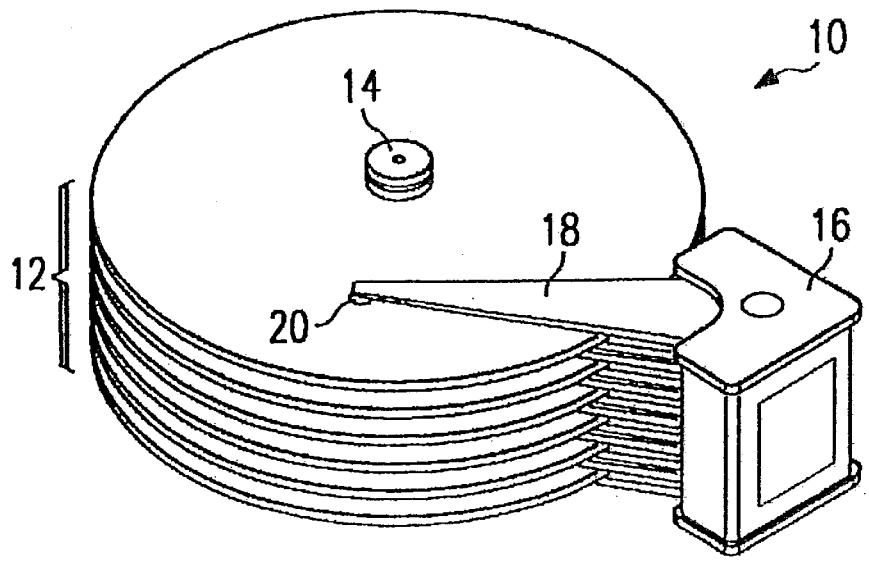
FIG. 1 is a perspective view of a disk drive mass storage system.
Figure 2:
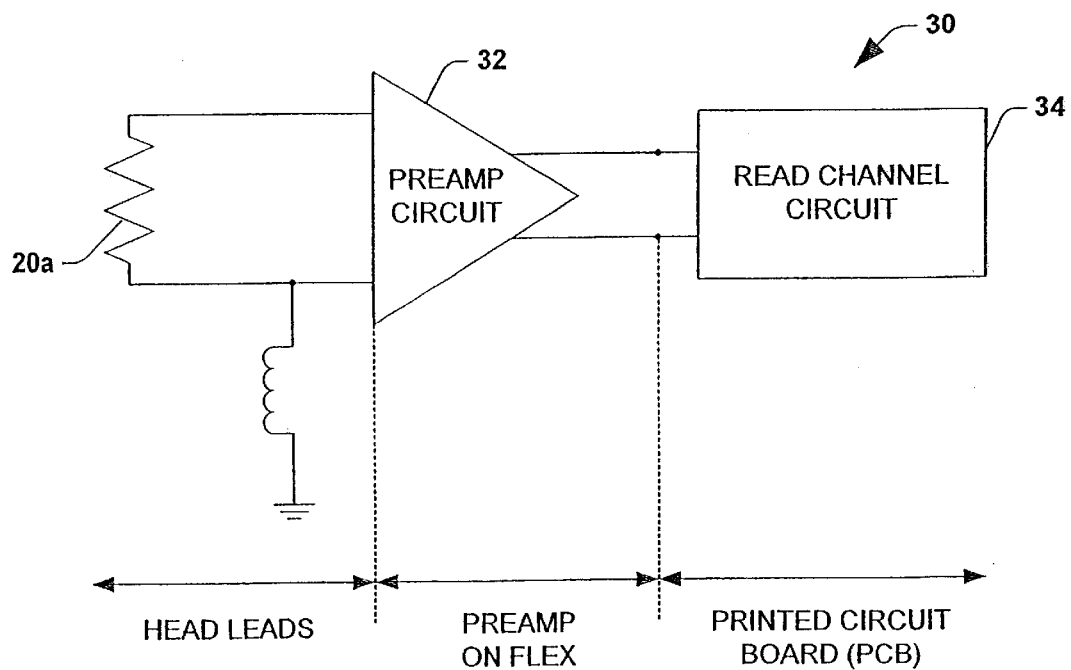
FIG. 2 is a schematic diagram illustrating circuitry associated with read/write operations in a disk drive mass storage system.
Figure 3:
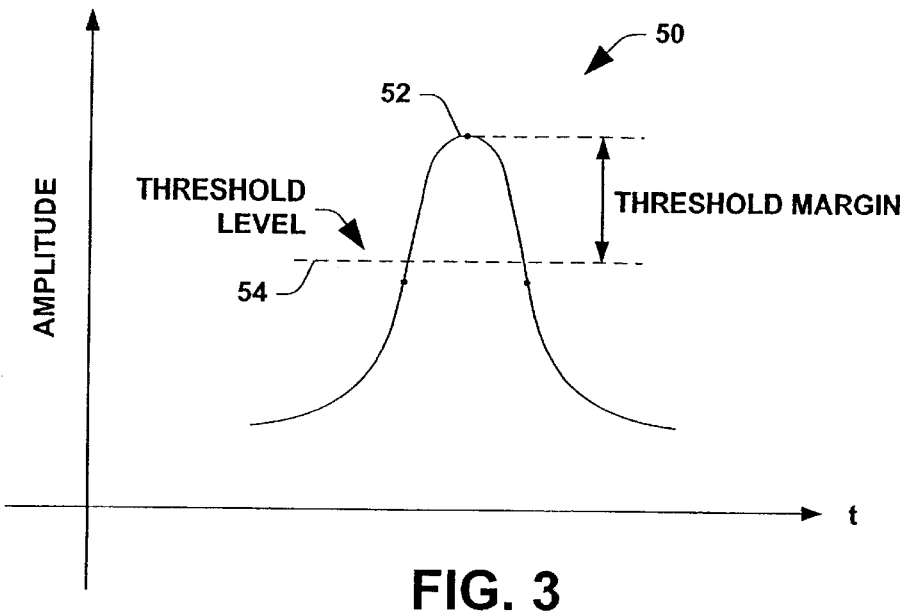
FIG. 3 is waveform diagram illustrating threshold margin in a digital peak detector system.

Threshold margin may be defined as the absolute value of the difference between the detected peak sample and a threshold level setting of the peak detector. The threshold margin may be understood illustratively in FIG. 3. In FIG. 3, a pulse 50 having a peak 52 associated therewith is illustrated. A threshold level 54 may be a minimum level that can be sensed by the digital peak detector sense circuitry, or alternatively may be an arbitrary level set by a user. Note that for a large peak, the threshold margin will be large, indicating that there is little concern that such a peak 52 will not be detected; that is, be a "missing bit." Similarly, for a small peak (not shown), since the threshold margin is an absolute value of the difference between the peak and the threshold, a large threshold margin will also be identified. However, since such small peaks will not be identified by the peak detector (since they are below the threshold employed for detection), such instances will not be evaluated. Therefore one can see that for detected peaks 52, the threshold margin provides information regarding how much headroom or margin the detected peaks have before potentially becoming a "missing bit."

According to one aspect of the present invention, a count of detected peaks that have a threshold margin below a predetermined quantity (called, for example, a margin test level) is made. Therefore such a count provides a user an indication of how reliably the digital peak detector circuit is working with respect to "missing bit" errors. For example, if the count of peaks below the margin test level is high, then poor threshold margins exist and there is a greater chance that some peaks are not being detected, resulting in greater "missing bit" errors. In addition, by making the margin test level programmable, one can establish a count distribution to provide read channel circuit designers distribution data reflecting the robustness of a particular design with respect to "missing bit" error reliability.

Figure 4:
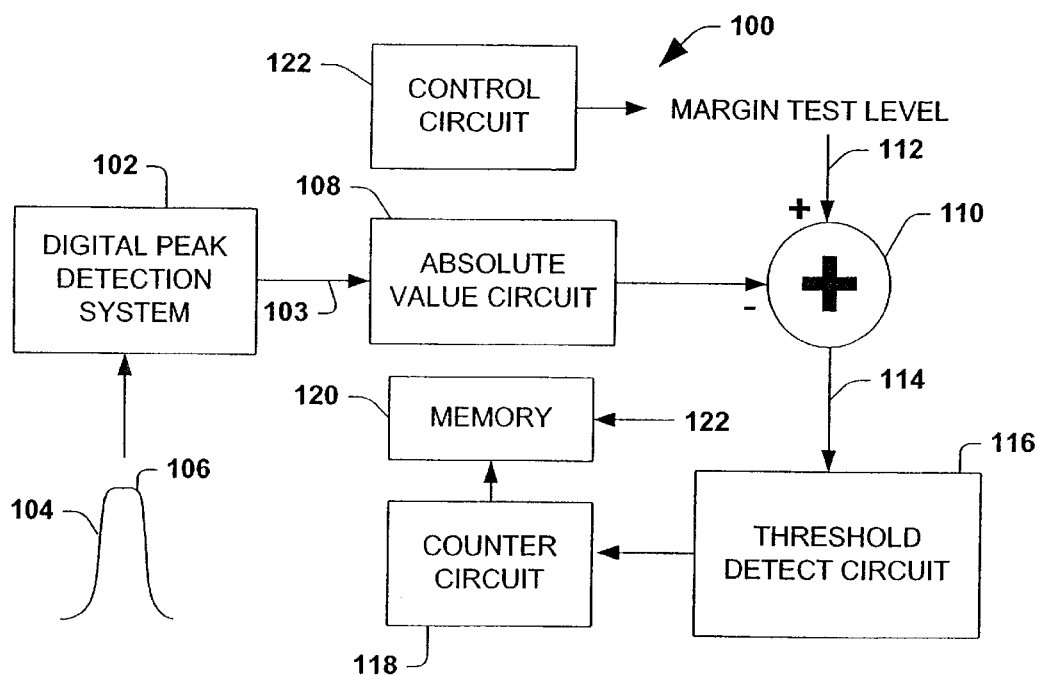
FIG. 4 is a block level diagram illustrating a threshold margin channel quality monitor system according to an aspect of the present invention.

According to one aspect of the present invention, an exemplary channel quality monitor system for determining a reliability with respect to "missing bit" threshold errors is disclosed and illustrated in FIG. 4, and designated at reference numeral 100. The system 100 includes a digital peak detection system 102 that receives an analog signal representation of data read from the media and digitally samples the analog signal to generate a plurality of digital values which reflect the signal. A sampled signal 104 having a pulse 106 associated therewith is illustrated in FIG. 4. The digital peak detection system is further operable to identify the peak sample data point 103 and output the data point to an absolute value circuit 108 which ensures that the peak sample data value is positive (since the detected pulse may be positive or negative). For example, the absolute value circuit 108 may simply look at a sign bit associated with the digital word which makes up the peak sample data value, and if the sign bit is negative, simply changes the sign bit to reflect a positive value. Alternatively, other forms of absolute value circuitry may be used and any such alternatives are contemplated as falling within the scope of the present invention.

The system 100 further comprises a comparison circuit 110 such as a summer or subtraction circuit. The comparison circuit 110 is operable to receive a margin test level 112 and compare the margin test level to the peak sample data value and output a signal 114 indicative of the comparison. For example, the peak sample data value may be subtracted from the margin test level as illustrated in FIG. 4, however, other forms of comparison may also be utilized and are contemplated as falling within the scope of the present invention. The indication signal 114 is operable to provide information relating to the comparison. For example, if the peak sample data value is greater than the margin test level 112, then the output signal 114 is at a first state which reflects that the detected peak has a relatively large threshold margin. Conversely, if the peak sample data value is less than the margin test level 112, then the output signal is at a second state, and even though the peak was large enough to be detected, the threshold margin associated therewith is relatively small which may be an undesirable condition.

The indication signal 114 may be transmitted to a threshold detect circuit 116 as illustrated in FIG. 4. According to one exemplary aspect of the present invention, the threshold detect circuit 116 comprises a digital comparator which compares the signal 114 to a null value and if the signal 114 is positive, the circuit 116 outputs a high digital value, and otherwise outputs a low digital value. A counter circuit 118 is operably coupled to the threshold detect circuit 116 and is operable to increment a count associated therewith every time the threshold detect circuit 116 outputs a high digital value, thus indicating a detected peak having a peak sample data value which is less than the margin test level 112. The incremented count of the counter 118 may then be saved in a memory 120, as may be desired.

In the above manner, it can be seen that the system 100 of FIG. 4 is operable to generate a count which is indicative of a number of detected peaks which have a magnitude which falls below a predetermined margin test level. Such count information may be accessed by a user to provide an indication of the reliability of a read channel circuit employing the digital peak detector system 102. In addition, the present invention contemplates varying the margin test level 112 to multiple values using, for example, a control circuit 122, and repeating the above analysis, thereby generating a count for each of the various margin test levels which may be saved in the memory 120. The multiple counts thus may constitute a count distribution as a function of margin test level which a user may analyze (e.g., by accessing the memory 120) to ascertain the reliability of the read channel circuit design with respect to threshold margin ("missing bit") errors.

Figure 5:
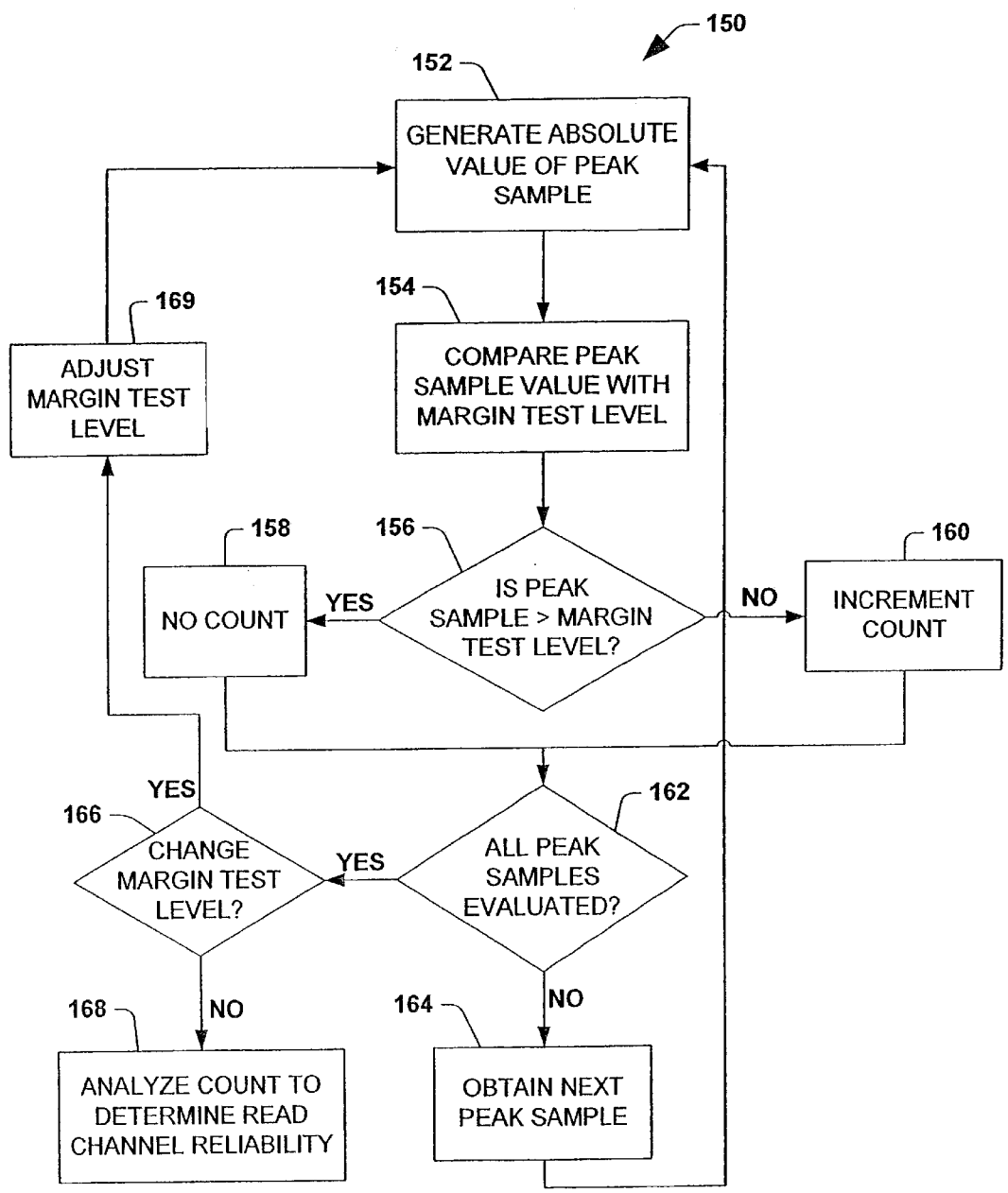
FIG. 5 is a flow chart diagram illustrating a method of providing error margin information for threshold errors associated with a digital peak detector according to another aspect of the present invention.

According to another aspect of the present invention, a method of providing error margin information for threshold errors associated with a digital peak detector system in a read channel circuit is disclosed, as illustrated in FIG. 5 and designated at reference numeral 150. The method 150 begins by obtaining a digital peak sample data value associated with a detected peak and taking the absolute value thereof at step 152. Since some detected peaks may be negative, the peak sample value may also be negative and taking the absolute value aids in simplifying subsequent analysis. This step, however, is not required, and if not used, a slightly different analysis would follow for negative peaks, wherein a negative margin test level would be used, etc. Various techniques may be employed to take the absolute value of the peak sample value. According to one exemplary aspect of the present invention, a sign bit associated with the peak sample value is evaluated and if the sign bit indicates a negative value, the sign bit is changed to reflect a positive value without altering the peak sample amplitude or magnitude value associated therewith. Alternatively, other ways of generating an absolute value of the digital peak sample value may be employed and any such alternatives are contemplated as falling within the scope of the present invention.

The method 150 then continues at step 154 wherein the positive peak sample data value is compared with a margin test level. At step 156 a query is made whether the peak sample data value is greater than the margin test level. If the data value is greater tan the margin test level (YES), then the peak is of a sufficient magnitude and no count is incremented (step 158). If, however, the peak sample data value is not greater than the margin test level at step 156 (NO), then the peak magnitude is relatively small and a count is incremented at step 160. Various forms of comparison may be utilized at steps 154 and 156, for example, using a digital comparator circuit, a summation circuit or a subtraction circuit coupled with a threshold detect circuit, etc., and any manner of performing such a comparison may be employed and are contemplated as falling within the scope of the present invention.

Once the count has either been incremented or not incremented based on the decision at step 156, the method continues at step 162 where a query is made whether all the peak samples of interest have been evaluated. If not, the next peak sample is obtained at step 164 and the analysis continues back at step 152 for that next sample. Otherwise (YES at step 162), another query is made at step 166 whether a change in the margin test level is desired. If not, the method ends at step 168; otherwise (YES at step 166), the margin test level is changed to a new value and the analysis again begins at step 152. Ultimately, the analysis ends at step 168 when multiple peak samples have been analyzed at one or multiple margin test levels. The count(s) may then be analyzed either individually or as a count distribution to ascertain the read channel circuit reliability, as discussed above.

According to another aspect of the present invention, a peak shift margin channel quality monitor system is disclosed. In order to appreciate the manner in which the present invention operates, a brief discussion relating to peak shifts follows below.

Figure 6:
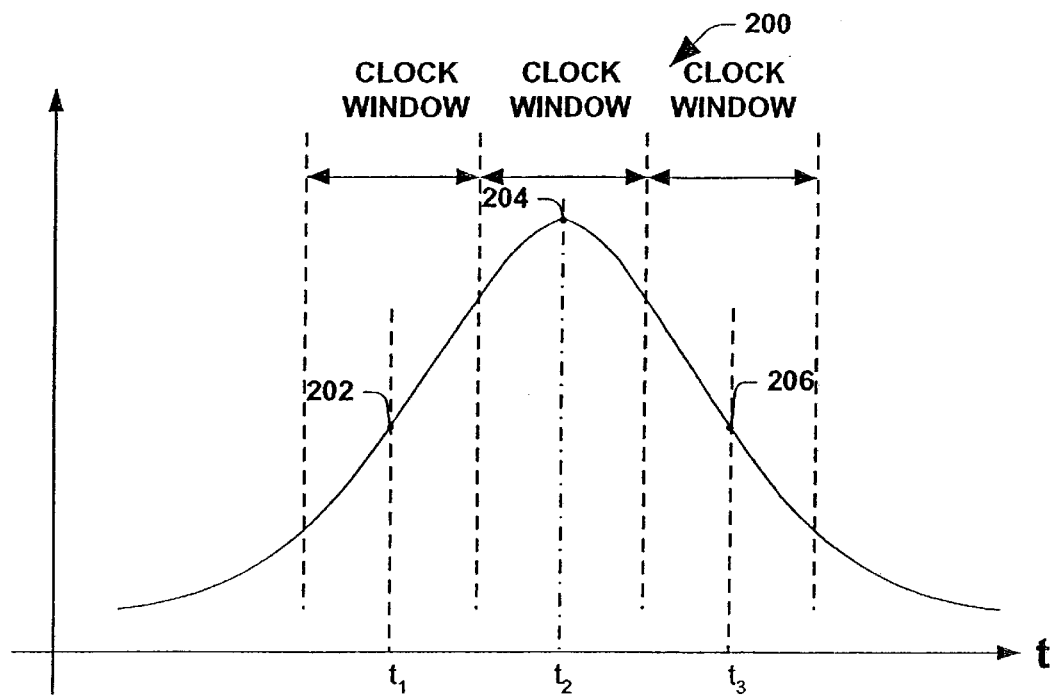
FIG. 6 is a waveform diagram illustrating a detected peak waveform detected by a digital peak detector which is centered within a sampling window.
Figure 7:
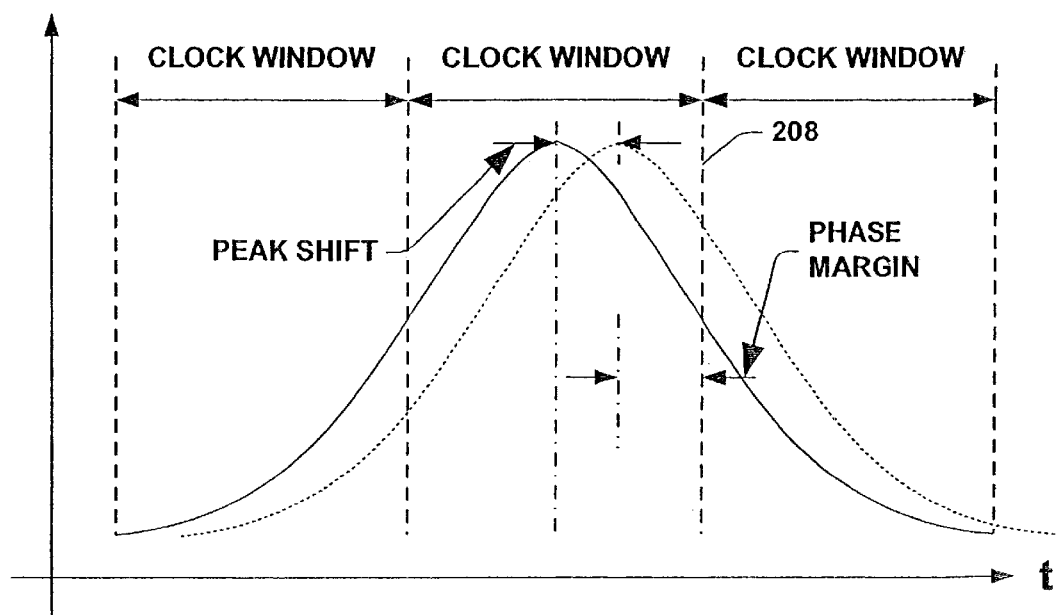
FIG. 7 is a waveform diagram illustrating a detected peak waveform which has experienced a peak shift.

In digital peak detection, if a peak is sampled perfectly without any peak shift, then the samples on either side of the peak sample should be equal, assuming a symmetrical pulse. For example, as illustrated in FIG. 6, an analog pulse 200 may be sampled at a plurality of points as dictated by the sampling frequency. Three sample points 202, 204 and 206 are illustrated in FIG. 6 for purposes of simplicity. For example, at sample times $t_1$ and $t_3$ the value associated with the sample points 202 and 206 are equal since the peak is centered within its clock window. As the timing associated with a detected pulse is skewed early or late, the peak sample 204 is no longer centered in its clock window, but instead is shifted; this shift is called a peak shift, as illustrated in FIG. 7. In addition, a distance between the peak sample 204 and an edge 208 of the clock window decreases. If the peak sample 204 crosses over the edge 208 to another clock window, the peak sample 204 will not be detected, and a peak shift error occurs. Therefore a distance between the peak sample 204 and the clock window edge 208 is referred to as a phase margin, which reflects how close the peak is to being missed. Therefore it is desirable for a read channel to exhibit a large phase margin.

Figure 8:
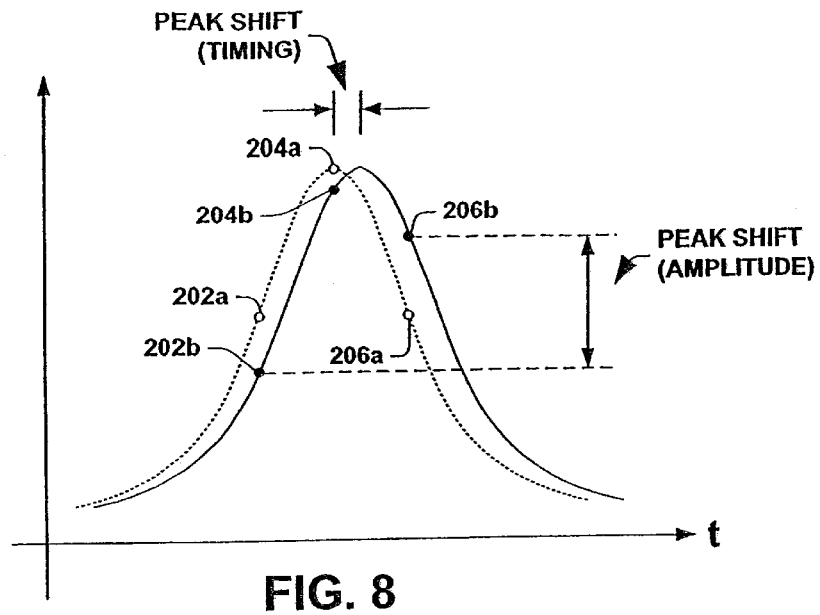
FIG. 8 is a waveform diagram illustrating a determination of a peak shift amplitude associated with a waveform which has experienced a peak shift according to an aspect of the present invention.

Turning now to FIG. 8, it was appreciated by the inventors of the present invention that as a detected peak is skewed early or late, the absolute value of the difference between the samples to either side of the peak (e.g., samples 202*b* and 206*b*) grows. That is, for a peak exhibiting no peak shift, 206*a*–202*a*=0, whereas the peak 200*b* of FIG. 8 exhibits a peak shift and therefore 206*b*–202*b*≠0. Furthermore, as the peak shift increases, the absolute value of the difference also increases. Once this difference (which may be referred to as a peak shift amplitude) exceeds a predetermined amount, a peak shift will occur. Therefore the present invention is directed to evaluating an amount of peak shift associated with detected pulses without having to perform a direct measurement of the timing shift. In addition, although the present discussion assumed a symmetrical pulse as illustrated, the present invention also contemplates a similar analysis with asymmetrical pulses (e.g., as may occur with magneto resistive (MR) type heads). In such as case, the pulse asymmetry may be addressed using a programmed offset that may either be fixed or be a function of a sensed amount of asymmetry. In either event, peak shift may be inferred using a calculation such as 206*b*–202*b*+ offset to generate the peak shift amplitude.

In addition to taking into account any pulse asymmetry via an offset, the present invention also contemplates taking into account any inter-symbol interference that occurs when two detected pulses are spaced closely together (sometimes referred to as 2T spacing when pulses are separated by two clock windows). In the case where there is a pulse that is two channel clocks away from another pulse, the inter-symbol interference will cause the ideal difference between the samples on either side of the peak sample to be nonzero. An example of this effect is shown in FIG. 9.

Figure 9:
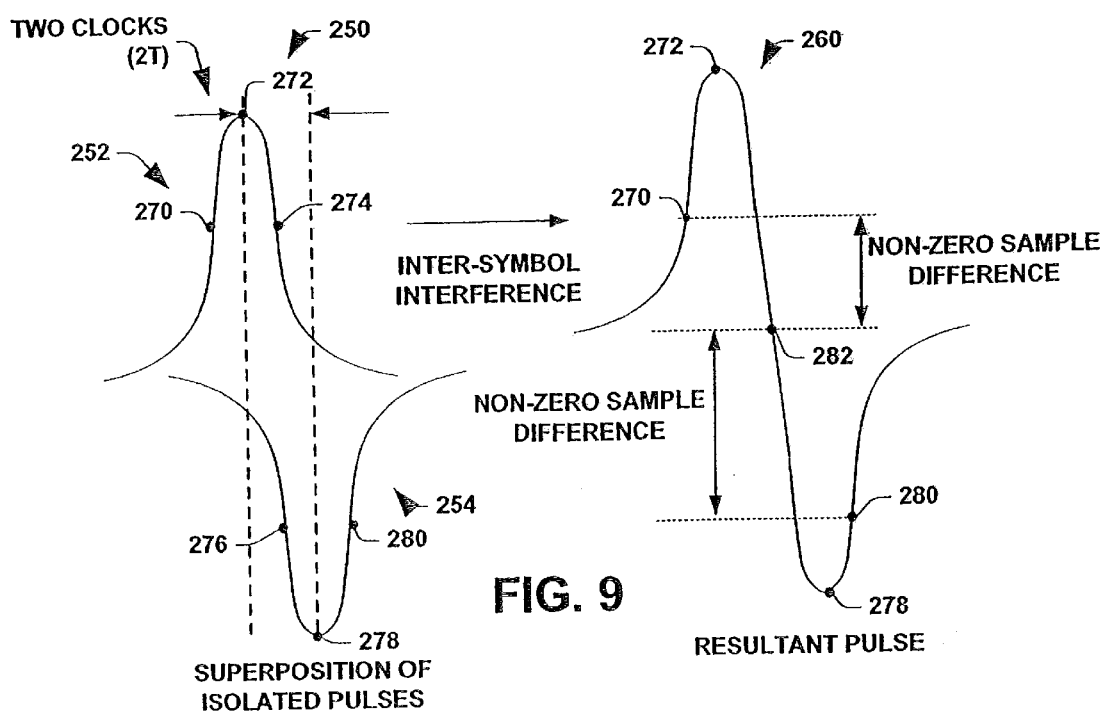
FIG. 9 is a series of waveform diagrams illustrating an example of two closely spaced detected pulses within two clock cycles (2T)

In a first portion 250 of FIG. 9, two pulses 252 and 254 are shown ideally centered in their respective clock windows. The second portion 260 of FIG. 9 shows the result of a linear superposition of the two pulses 252 and 254 with inter-symbol interference. The present invention contemplates such possibilities, and under such detected condition, a peak shift amplitude is calculated using the samples (e.g., 202*b* and 206*b*) along with a correction factor such that peak shift amplitude =206*b*–202*b*+ "correction factor." For example, in the example of portion 260, without a correction factor, the absolute value of the difference between data points 270 and 282 is nonzero even though the pulse 250 associated therewith is ideally centered and is not experiencing any peak shift (and thus the difference should be zero). The phase detector portion of the digital peak detector will sense this condition and add a correction factor which is equal to, for example, the negative of the absolute value of the amplitude difference of points 280 and 282. Any other type of correction factor which accounts for inter-symbol interference may also be utilized and is contemplated as falling within the scope of the present invention.

Figure 10:
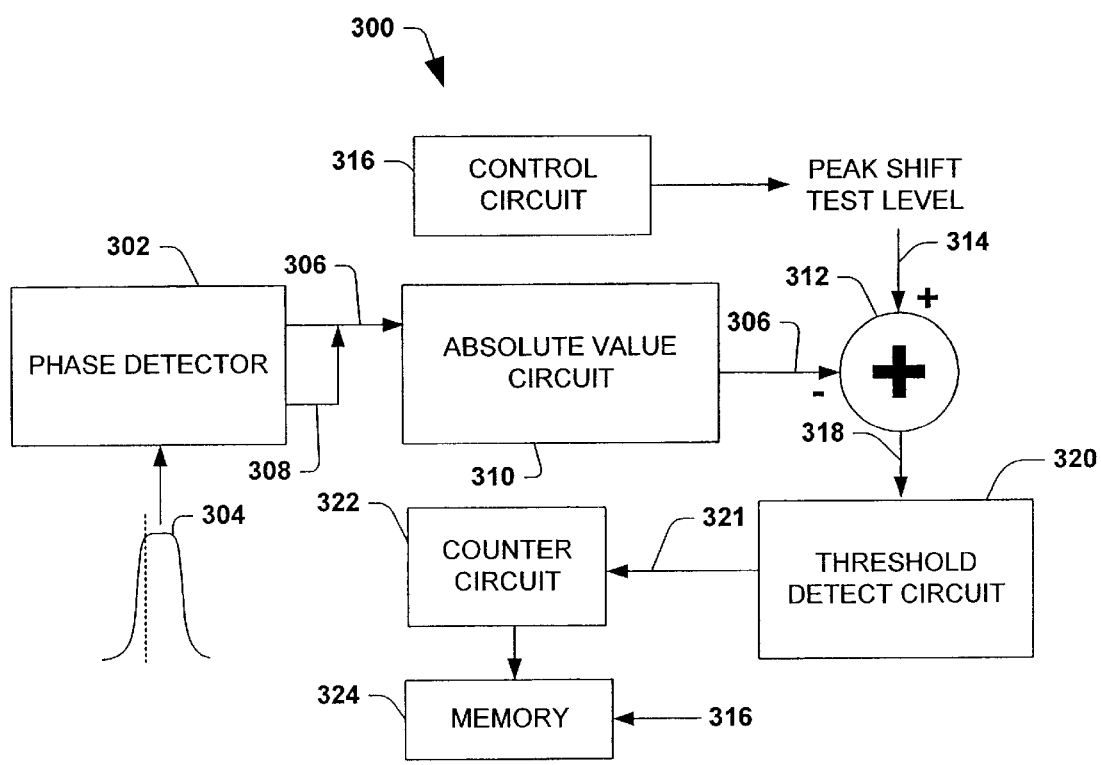
FIG. 10 is a block diagram illustrating a peak shift margin channel quality monitor system according to another aspect of the present invention.

According to an exemplary aspect of the present invention, a peak shift margin channel quality monitor system is disclosed in FIG. 10, and designated at reference numeral 300. The system comprises a phase detector system 302 which is associated with a digital peak detector system in a read channel circuit. The phase detector 302 may comprise part of the digital phase detector timing loop and is operable to detect peaks 304 associated with a read signal and generate and provide a plurality of peak sample data points associated with the detected peaks. In addition, the phase detector 302 is operable to calculate and provide an amplitude difference 306 between two sample data points that are on either side of the peak sample, for example, the data points 202*b* and 206*b* illustrated in FIG. 8. In addition, the peak detector 302 is operable to ascertain whether the detected pulses are symmetric and further whether they are close enough together in proximity to require an accounting for inter-symbol interference. Upon such determinations, the phase detector 302 is further operable to generate and provide offset data and correction factor data, collectively indicated by reference numeral 308. Such offset and/or correction data 308 may then be combined with the difference result 306 to generate the peak shift amplitude and provided collectively to the remaining circuitry within the system 300.

According to one aspect of the present invention, the peak sample data points provided by the phase detector 302 are at least three data points, wherein the second of the three data points reflects a peak sample data value (e.g., sample 204*a* of FIG. 8) if no peak shift existed and the first and third data points straddle the peak sample, for example, by an equal amount (the absolute value of their difference being zero (206a–202a)) with respect to the sampling timing. The difference 306 between the two straddling data points is provided to an absolute value circuit 310 which takes the absolute value of the data point values (to take into account pulses that are shifted in either the positive or negative direction).

The absolute value of the difference 306 between the straddling data points (and any offset/correction factors) is then input to a comparison circuit 312, for example, a summer or subtraction type circuit, wherein the difference 306 is compared with a peak shift test level. Various forms of comparison circuitry may be employed and any such functional circuits are contemplated as falling within the scope of the present invention. According to one aspect of the invention, the comparison circuit comprises a subtraction circuit which subtracts the absolute value of the difference 306 from a peak shift test level 314, which may be set by a control circuit 316. A result 318 of the subtraction is then input to a detection circuit 320 such as a threshold detect circuit to ascertain whether the result is positive or negative. For example, if the result 318 is positive, then the difference 306 (which may include the offset or correction factor data) is greater than the peak shift test level, which indicates a substantial amount of peak shift associated with the detected pulse 304. If the result 318 is negative, however, then the peak shift test level is greater than the difference 306 and the peak shift is relatively smaller. The detection circuit 320 may thus be operable to detect a sign of the result 318. Alternatively, however, any other type of analysis or functionality that reviews the result 318 and provides an indication 321 associated therewith may be used and is contemplated as falling within the scope of the present invention.

The system 300 of FIG. 10 further comprises a counter 322 which is operably coupled to the detection circuit 320. The counter 322 receives the indication 321 from the detection circuit 320 and if the indication 321 indicates that the peak shift amplitude is greater than the peak shift test level 314, then a count associated therewith is incremented. Otherwise, the counter does not get incremented. Consequently, for each detected pulse 304, whenever a peak shift amplitude associated therewith (which is reflected by the difference 306 and any offset/correction factors) exceeds a predetermined amount (as determined by the peak shift test level 314), the counter 322 gets incremented. Such a count may then be saved in a memory 324. Therefore a count in the memory 324 associated with the counter 322 provides a user an indication of the number of detected pulses which exhibit a peak shift that exceeds a predetermined amount.

In addition, the system 300 is operable to repeat the above functionality for a plurality of different peak shift test level values. For example, once a number of peaks have been detected and analyzed using a first peak shift test level 314 and a count is established associated therewith, the same peaks may again be analyzed with a different peak shift test level 314 using, for example, a control circuit 316. By repeating such analysis for a plurality of different peak shift test levels and saving the count associated with each of the test levels in the memory 324, a count distribution may be generated and analyzed by a user. Such a count distribution which is a function of peak shift test level provides a user an indication of the reliability of the read channel circuit design with respect to peak shift errors.

Figure 11:
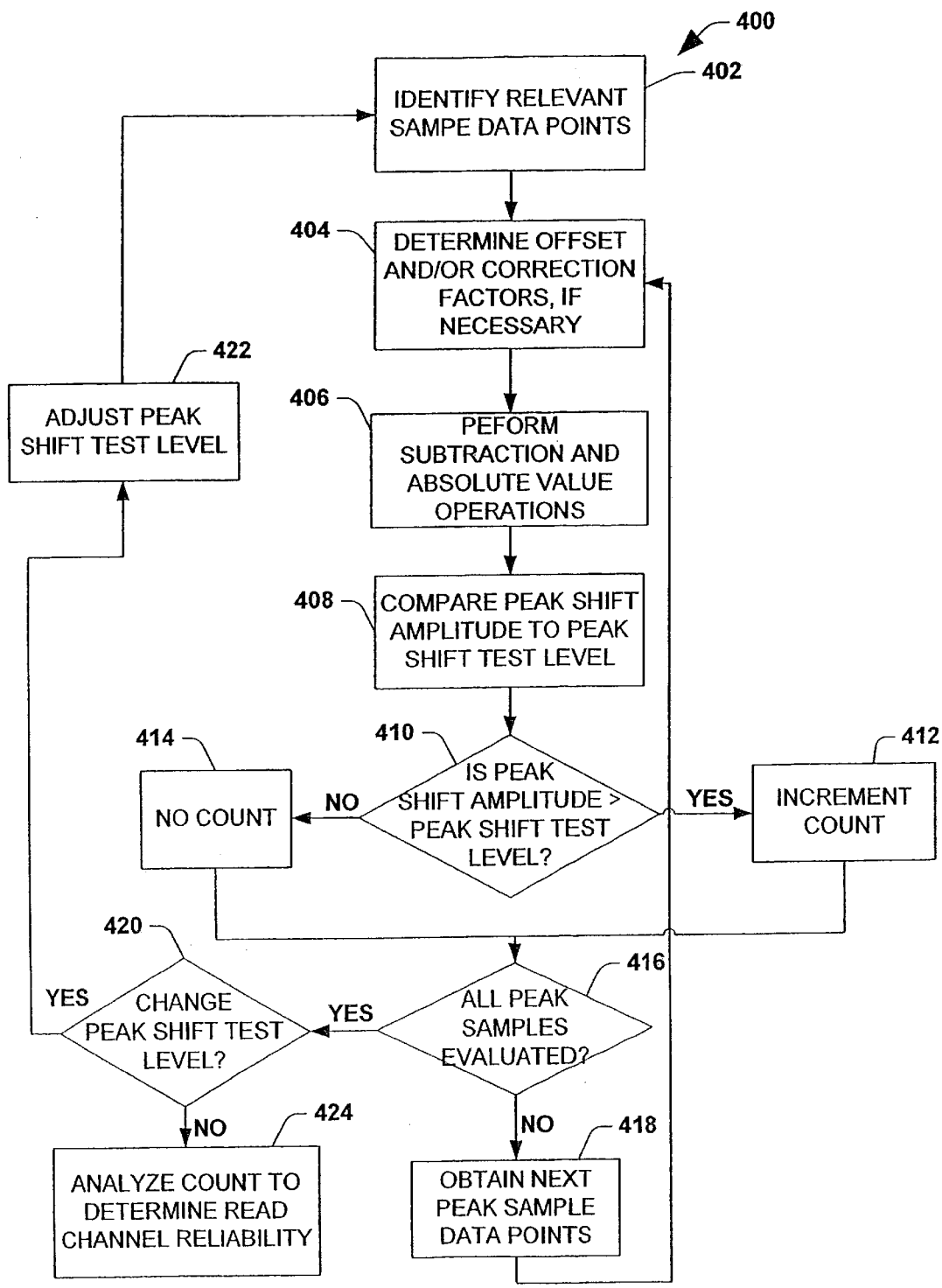
FIG. 11 is a flowchart diagram illustrating a method of providing error margin information for peak shift errors associated with digital peak detector according to another aspect of the present invention.

According to yet another aspect of the present invention, a method of providing error margin information for peak shift errors associated with a digital peak detector system in a read channel circuit is illustrated in FIG. 11 and designated at reference numeral 400. The method 400 begins at step 402 by identifying the relevant sample data points. For example, step 402 may comprise identifying the peak sample data point and two additional sample data points that straddle the peak sample, for example, at equally spaced apart timing intervals from the peak data point.

In addition, at step 404 it is determined whether any offset or correction factors may be needed for subsequent analysis. As discussed supra, if a pulse asymmetry is detected, an offset factor may be determined which has a value which is a function of the degree of asymmetry. In addition, or alternatively, if successive pulses are relatively close together (e.g., 2T spacing), then their superposition results in inter-symbol interference. If such a condition is detected, a correction factor may be generated to account for such interference. Such factors are helpful in ascertaining more accurately an amount of peak shift associated with a detected peak.

The method 400 continues at step 406, wherein the relevant data points are analyzed, for example, by calculating an absolute value of their difference (e.g., ABS(206b–202b), as illustrated in FIG. 8). In addition, if any offset or correction factors are present from step 404, step 406 contemplates incorporating such factors into the operations discussed above such that the result subsequently utilized includes such detected peak characteristics. The result of step 406 may be identified as a peak shift amplitude value having a magnitude which relates to an amount of peak shift associated with the detected pulse.

The generated peak shift amplitude is them compared to a peak shift test level at step 408. For example, the two values may be input into a digital comparator circuit having an output state which reflects which input value is larger. Alternatively, such comparing step 408 may entail a subtraction operation, wherein the peak shift test level is subtracted from the peak shift amplitude. Any such comparison of the values may be employed and such comparisons are contemplated as falling within the scope of the present invention.

A query is then made at step 410 to determine whether the peak shift amplitude is greater than the peak shift test level. For example, by analyzing the result of the comparison of step 408, such a query is answered. If the peak shift amplitude is greater than the peak shift test level (YES at step 410), then the peak shift amplitude (which reflects an amount of peak shift in the detected pulse) is greater than the predetermined amount and a count is incremented at step 412 to account for this detected condition. Alternatively, if the answer to the query of step 410 is negative, then no count is incremented (step 414).

After the query of step 410 and the increment/no increment steps 412 and 414, a query is made whether all the desired peak samples have been evaluated at step 416. If not, then the next set of relevant peak sample data points are obtained at step 418 and the analysis is performed again. Otherwise, another query is made to determine whether it is desired that the peak shift test level is altered at step 420. If the answer is YES, then the peak shift test level is adjusted at step 422 and the method 400 repeats again. Otherwise, if no change in peak shift test level is desired (or if all peak shift test levels have been used in the testing) (NO at step 420), then the count data is saved in a memory and is available for analysis either as a single count or a count distribution. As discussed above, a count distribution provides a designer information relating to how close the read channel circuitry is to experiencing peak shift errors and thus provides an indication with respect to the reliability of the circuitry.

Figure 12:
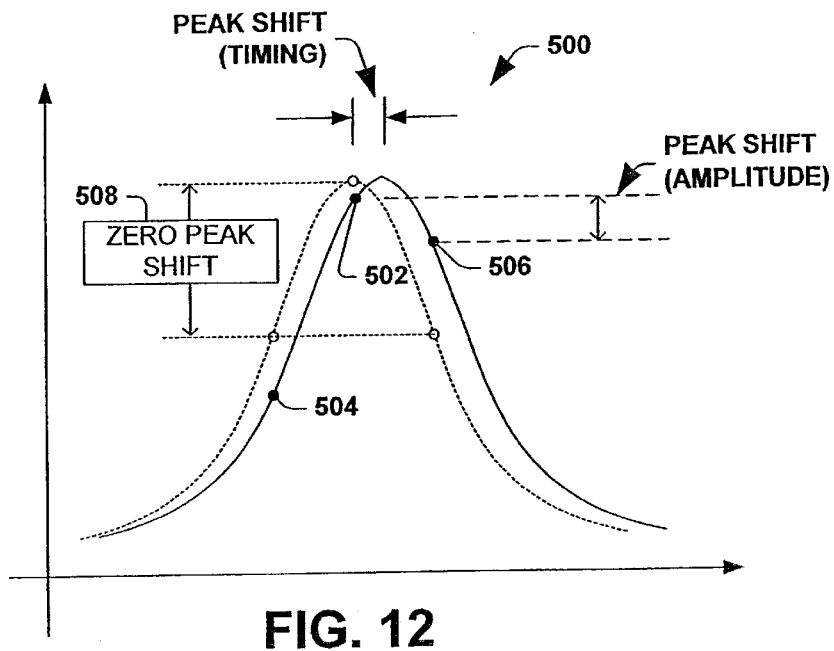
FIG. 12 is a waveform diagram illustrating another manner of calculating a peak shift amplitude according to an aspect of the present invention.

According to still another aspect of the present invention, another system and method may be employed to ascertain the reliability of a read channel circuit with respect to peak shift errors. Turning to FIG. 12, a detected pulse 500 is illustrated having a peak shift as shown. According to this aspect of the present invention, a peak shift amplitude characteristic associated with a detected pulse is defined in a different manner than discussed previously. For example, instead of evaluating first and third data points that straddle a peak data point, the peak shift amplitude is defined as the absolute value of the difference between the peak sample and the sample which is closest to the peak sample in amplitude. Therefore, referring to FIG. 12, a pulse 500 has a sample 502 which would be at a peak of the pulse if no peak shift occurs. In addition, two other sample data points 504 and 506 exist which straddle the sample 502, wherein one data point 506 has an amplitude which is closer to the sample 502 amplitude than the other data point 504.

As can be seen from FIG. 12, if the pulse 500 were perfectly centered in its timing window (as illustrated in phantom) and thus exhibited no peak shift, the samples 504 and 506 to either side of the peak sample 502 are equal and an ideal value measured is at some constant amplitude as shown in the box 508 labeled zero peak shift. Thus the zero peak shift would be represented by the absolute value of the difference between the points 502 and 506 as shown in phantom. As the peak shifts from the center point, however, as illustrated, one of the sample amplitudes (e.g., sample 506) will move closer to the amplitude of the original peak sample 502 while the other point 504 moves further away in amplitude. This difference between points 502 and 506 is defined in this aspect of the invention as the peak shift amplitude. Thus as the peak shift amplitude as defined in FIG. 12 decreases, the peak shift increases. Therefore in the analysis which follows, the peak shift amplitude will be compared to a peak shift test level to see if it is smaller than the test level and increment a count when such conditions are detected.

Figure 13:
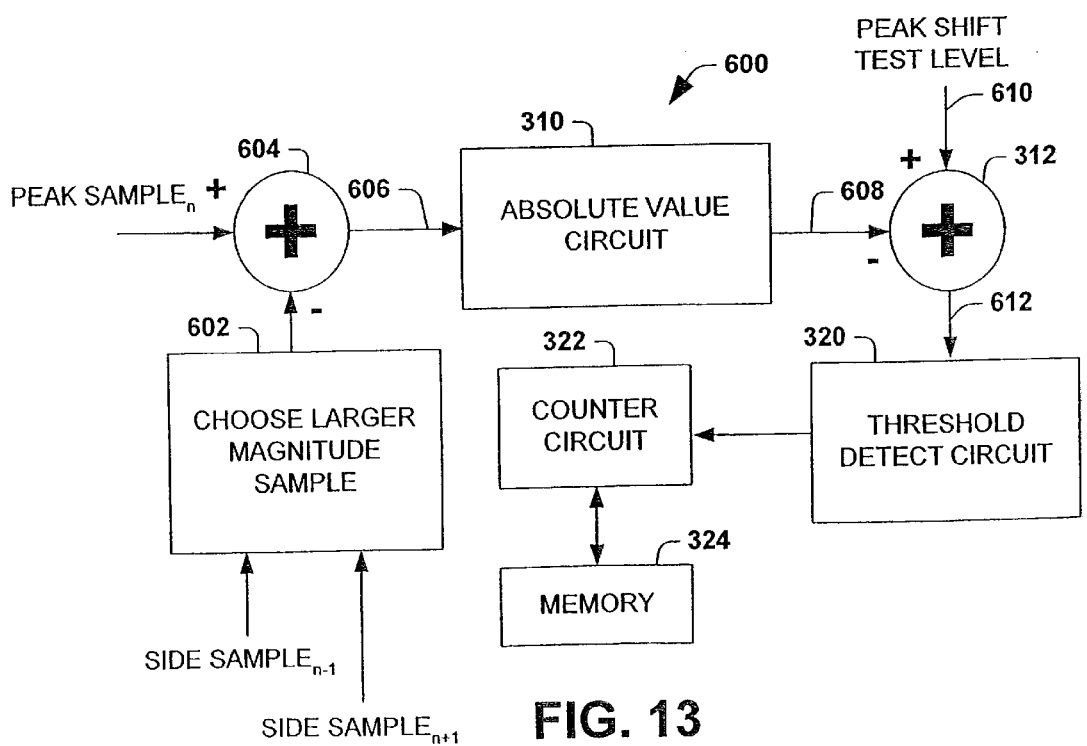
FIG. 13 is a block diagram illustrating a peak shift margin channel quality monitor system according to yet another aspect of the present invention.

Turning now to FIG. 13, a system 600 for monitoring a system for peak shift errors is illustrated. The system 600 is similar to the system 300 of FIG. 10 in several respects. Some differences, however, do exist. For example, system 600 comprises a circuit 602 which is operable to receive the two side samples (sample n−1 and sample n+1) which lie on either side of the peak sample data point. The circuit 602 receives the two data points and selects the one data point having the larger magnitude. The larger sample data point is then compared to the peak sample data point using, for example, a subtraction circuit 604 to calculate a difference in amplitude 606 therebetween. The difference 606 is then input to the absolute value circuit 310 and outputs a peak shift amplitude value 608 as defined above with respect to FIG. 12. Like the system 300, the system 600 may account for pulse asymmetry and/or inter-symbol interference using offsets or correction factors, as may be needed or desired. The peak shift amplitude 608 is then input to another comparison circuit 312 such as a subtraction circuit which subtracts the peak shift amplitude value from a peak shift test level 610. The result 612 is then fed to the threshold detect circuit 320 which provides an output having a state which reflects whether the result 612 is positive or negative. If the result 612 is positive, then the peak shift amplitude is undesirably small, indicating a substantial peak shift, and the threshold detect circuit 320 outputs an indication signal causing the counter 322 to increment a count associated therewith. Conversely, if the result 612 is negative, then the peak shift amplitude is a larger value, indicating a smaller peak shift. Therefore the threshold detect circuit 320 outputs an indication signal to the counter 322 which causes no incrementation of the count.

By repeating such analysis for multiple peaks, the accumulated count will reflect how many detected pulses have peak shifts greater than a predetermined amount. Further, by altering the peak shift test level and repeating the above analysis for multiple test levels, a count distribution is generated which provides a user with distribution data which indicates a reliability of the read channel circuitry.

According to still another aspect of the present invention, a method of providing error margin information for peak shift errors using the peak shift amplitude definition of FIG. 12 may be employed in a manner similar to the flow chart of FIG. 11, however, several differences will exist. For example, the identifying of relevant data points will comprise identifying the peak sample data point and the larger of the two straddling data points. In addition, since the definition of the peak shift amplitude differs, the query of step 410 changes, and instead one asks whether the peak shift amplitude is less than the peak shift level such that an affirmative answer increments the counter. In the above manner, a count or count distribution may be generated which aids a designer in ascertaining the reliability of the read channel circuit with respect to peak shift errors.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application. Furthermore, to the extent that the term "includes" is used in either the detailed description and the claims, such term is intended to be inclusive in a manner similar to the term "comprising."

What is claimed is:

1. A method of providing error margin information for threshold errors associated with a digital peak detector, comprising the steps of:

comparing a plurality of peak sample values associated with the digital peak detector to a threshold margin test level; and incrementing a counter each time the threshold margin test level exceeds one of the plurality of peak sample values, wherein a value associated with the counter relates to an amount of threshold margin associated with the digital peak detector.

2. A method of providing error margin information for threshold errors associated with a digital peak detector, comprising the steps of:

comparing a plurality of peak sample values associated with the digital peak detector to a threshold margin test level;

incrementing a counter each time the threshold margin test level exceeds one of the plurality of peak sample values, wherein a value associated with the counter relates to an amount of threshold margin associated with the digital peak detector;

altering the threshold margin test level a plurality of times; and repeating the steps of comparing the plurality of peak sample values to the various altered threshold margin test levels and incrementing the counter, wherein the values associated with the counter for the plurality of threshold margin test levels provide an indication of an amount of threshold margin associated with the digital peak detector.

3. The method of claim 2, further comprising the step of initializing the counter to an initial value each time the steps of comparing and incrementing the counter are repeated.

4. The method of claim 1, further comprising the step of generating an absolute value of the plurality of peak sample values prior to the step of comparing the plurality of peak sample values to the threshold margin test level.

5. A method of providing error margin information for threshold errors associated with a digital peak detector in a read channel circuit, comprising the steps of:

(a) initializing a counter to an initial value;

(b) obtaining a peak sample value from the digital peak detector;

(c) comparing an absolute value of the peak sample value associated with the digital peak detector to a margin test level;

(d) incrementing a count associated with the counter if the compared peak sample value is greater than the margin test level;

(e) obtaining another peak sample value;

(f) repeating the steps (c)—(e) a plurality of times; and (g) evaluating the count, wherein the count indicates a number of peak samples having an amplitude that is less than the margin test level.

6. The method of claim 5, further comprising the steps of:

(h) altering the margin test level;

(i) repeating the steps (a)—(f) using the altered margin test level; and (j) repeating steps (h) and (i) for a plurality of different margin test levels, thereby generating a count distribution as a function of margin test level, wherein the count distribution is indicative of an amount of threshold margin existing in the read channel circuit.

7. A threshold margin channel quality monitor system, comprising:

a digital peak detector system operable to detect peaks associated with a read signal and generate a value associated with a magnitude of the detected peaks;

a comparison circuit operable to compare the magnitude of a detected peak from the digital peak detector system with a margin test level value, and output a signal indicative of whether the detected peak magnitude is greater or less than the margin test level; and a counter circuit operable to increment a count associated therewith when the signal indicates that the detected peak level is less than the margin test level, and wherein the count is indicative of a number of detected peaks having levels less than the margin test level.

8. The system of claim 7, wherein the comparison circuit further comprises:

a subtraction circuit operable to subtract the detected peak magnitude from the margin test level or vice-versa; and a threshold detect circuit operable to generate the indication having a state which is a function of whether a subtraction result of the subtraction circuit is positive or negative.

9. The system of claim 8, wherein the subtraction circuit is operable to output a high digital value when a subtraction of the detected peak magnitude from the margin test level is positive and a low digital value when the subtraction is negative.

10. The system of claim 7, further comprising a memory associated with the counter and operable to store the count associated therewith.

11. A threshold margin channel quality monitor system, comprising:

a digital peak detector system operable to detect peaks associated with a read signal and generate a value associated with a magnitude of the detected peaks;

a comparison circuit operable to compare the magnitude of a detected peak from the digital peak detector system with a margin test level value, and output a signal indicative of whether the detected peak magnitude is greater or less than the margin test level;

a counter circuit operable to increment a count associated therewith when the signal indicates that the detected peak level is less than the margin test level, and wherein the count is indicative of a number of detected peaks having levels less than the margin test level; and a control circuit operable to alter the margin test level one or more times after establishing the count for a predetermined number of sample peaks, thereby generating a count associated with the predetermined number of sample peaks for multiple margin test levels, thereby generating a count distribution as a function of margin test levels, wherein the count distribution provides an indication of how close a read channel circuit is to experiencing threshold errors.

12. The system of claim 7, further comprising an absolute value generator circuit operable to receive detected peak samples from the digital peak detector system and output an absolute value of each of the detected peak samples.

13. A threshold margin channel quality monitor system, comprising:

a digital peak detector system operable to detect peaks associated with a read signal and generate a value associated with a magnitude of the detected peaks;

a comparison circuit operable to compare the magnitude of a detected peak from the digital peak detector system with a margin test level value, and output a signal indicative of whether the detected peak magnitude is greater or less than the margin test level;

a counter circuit operable to increment a count associated therewith when the signal indicates that the detected peak level is less than the margin test level, and wherein the count Is Indicative of a number of detected peaks having levels less than the margin test level; and an absolute value generator circuit operable to receive detected peak samples from the digital peak detector system and output an absolute value of each of the detected peak samples, wherein the absolute value generator circuit comprises a sign bit detector circuit operable to analyze a sign bit associated with the detected peak sample magnitude and change the sign bit if the sign bit reflects a negative value.

14. A method of providing error margin information for peak shift errors associated with a digital peak detector, comprising the steps of:

identifying relevant peak sample data points associated with each of a plurality of detected peaks;

determining a peak shift amplitude associated with each of the detected peaks using the identified relevant peak sample data points;

comparing the peak shift amplitudes associated with the detected peak to a peak shift test level; and incrementing a counter each time the peak shift amplitudes associated with the detected peaks exceed the peak shift test level, wherein a value associated with the counter relates to an amount of peak shift margin associated with the digital peak detector.

15. A method of providing error margin information for peak shift errors associated with a digital peak detector, comprising the steps of:

identifying relevant peak sample data points associated with each of a plurality of detected peaks;

determining a peak shift amplitude associated with each of the detected peaks using the identified relevant peak sample data points;

comparing the peak shift amplitudes associated with the detected peak to a peak shift test level; and incrementing a counter each time the peak shift amplitudes associated with the detected peaks exceed the peak shift test level, wherein a value associated with the counter relates to an amount of peak shift margin associated with the digital peak detector, wherein the step of identifying relevant peak sample data points comprises identifying three digital sample data points in which at least two of the data points straddle a peak portion of a detected peak.

16. The method of claim 15, wherein determining the peak shift amplitude comprises subtracting a value associated with a first of the three data points from a value associated with a third of the three data points.

17. The method of claim 16, further comprising the step of determining the absolute value of the subtraction result.

18. A method of providing error margin information for peak shift errors associated with a digital peak detector, comprising the steps of:

identifying relevant peak sample data points associated with each of a plurality of detected peaks;

determining a peak shift amplitude associated with each of the detected peaks using the identified relevant peak sample data points;

comparing the peak shift amplitudes associated with the detected peak to a peak shift test level; and incrementing a counter each time the peak shift amplitudes associated with the detected peaks exceed the peak shift test level, wherein a value associated with the counter relates to an amount of peak shift margin associated with the digital peak detector, wherein the method comprising repeating the steps of identifying relevant peak sample data points, determining the peak shift amplitudes, comparing the peak shift amplitudes to the peak shift test level, and incrementing the counter for a plurality of different peak shift test levels, thereby generating a count distribution as a function of peak shift test levels, wherein the count distribution provides an indication of how close a read channel circuit is to experiencing peak shift errors.

19. A method of providing error margin information for peak shift errors associated with a digital peak detector, comprising the steps of:

identifying relevant peak sample data points associated with each of a plurality of detected peaks;

determining a peak shift amplitude associated with each of the detected peaks using the identified relevant peak sample data points;

comparing the peak shift amplitudes associated with the detected peak to a peak shift test level;

incrementing a counter each time the peak shift amplitudes associated with the detected peaks exceed the peak shift test level, wherein a value associated with the counter relates to an amount of peak shift margin associated with the digital peak detector, determining whether a pulse associated with the peak sample data points is asymmetric; and using an offset value in determining the peak shift amplitude associated therewith.

20. The method of claim 19, wherein a magnitude of the offset value is a function of an amount of pulse asymmetry.

21. The method of claim 15, wherein determining the peak shift amplitude comprises subtracting a value associated with a second of the three data points from a value associated with a greater value of the first or third of the three data points.

22. The method of claim 21, further comprising the step of determining the absolute value of the subtraction result.

23. The method of claim 21, comprising repeating the steps of identifying relevant peak sample data points, determining the peak shift amplitudes, comparing the peak shift amplitudes to the peak shift test level, and incrementing the counter for a plurality of different peak shift test levels, thereby generating a count distribution as a function of peak shift test levels, wherein the count distribution provides an indication of how close a read channel circuit is to experiencing peak shift errors.

24. The method of claim 21, further comprising the steps of:

determining whether a pulse associated with the peak sample data points is asymmetric; and using an offset value in determining the peak shift amplitude associated therewith.

25. The method of claim 24, wherein a magnitude of the offset value is a function of an amount of pulse asymmetry.

26. A peak shift margin channel quality monitor system, comprising:

a digital peak detector system operable to detect peaks associated with a read signal and provide a plurality of peak sample data points associated with the detected peaks;

a comparison circuit operable to compare a value associated with two of the plurality of peak sample data points of a detected peak from the digital peak detector system which reflects a peak shift associated therewith with a peak shift test level, and output a signal indicative of whether the detected peak shift is greater or less than the peak shift test level; and a counter circuit operable to increment a count associated therewith when the signal indicates that the detected peak shift is greater than the peak shift test level, and wherein the count is indicative of a number of detected peaks having peak shifts greater than the peak shift test level.

27. A peak shift margin channel quality monitor system, comprising:
- a digital peak detector system operable to detect peaks associated with a read signal and provide a plurality of peak sample data points associated with the detected peaks;
- a comparison circuit operable to compare a value associated with two of the plurality of peak sample data points of a detected peak from the digital peak detector system which reflects a peak shift associated therewith with a peak shift test level, and output a signal indicative of whether the detected peak shift is greater or less than the peak shift test level; and
- a counter circuit operable to increment a count associated therewith when the signal indicates that the detected peak shift is greater than the peak shift test level, and wherein the count is indicative of a number of detected peaks having peak shifts greater than the peak shift test level,
- wherein the plurality of peak sample data points comprise at least three data points, wherein two of the three data points straddle a detected peak, and wherein the comparison circuit further comprises:
    - a subtraction circuit operable to calculate a difference between a value associated with a first of the three data points and a value associated with a third of the three data points, wherein the difference represents the peak shift amplitude value of the detected peak;
    - a second subtraction circuit operable to subtract the peak shift test level from the difference value associated with the detected peak; and
    - a threshold detect circuit operable to generate an indication having a state which is a function of whether a subtraction result of the second subtraction circuit is positive or negative.

28. The system of claim 27, wherein the threshold detect circuit is operable to output a high digital value when the subtraction result of the second subtraction circuit is positive and a low digital value when the subtraction is negative.

29. A peak shift margin channel quality monitor system, comprising:
- a digital peak detector system operable to detect peaks associated with a read signal and provide a plurality of peak sample data points associated with the detected peaks;
- a comparison circuit operable to compare a value associated with two of the plurality of peak sample data points of a detected peak from the digital peak detector system which reflects a peak shift associated therewith with a peak shift test level, and output a signal Indicative of whether the detected peak shift is greater or less than the peak shift test level;
- a counter circuit operable to increment a count associated therewith when the signal indicates that the detected peak shift is greater than the peak shift test level, and wherein the count is indicative of a number of detected peaks having peak shifts greater than the peak shift test level: and
- a memory associated with the counter and operable to store the count associated therewith.

30. A peak shift margin channel quality monitor system, comprising:
- a digital peak detector system operable to detect peaks associated with a read signal and provide a plurality of peak sample data points associated with the detected peaks;
- a comparison circuit operable to compare a value associated with two of the plurality of peak sample data points of a detected peak from the digital peak detector system which reflects a peak shift associated therewith with a peak shift test level, and output a signal indicative of whether the detected peak shift is greater or less than the peak shift test level;
- a counter circuit operable to increment a count associated therewith when the signal indicates that the detected peak shift is greater than the peak shift test level, and wherein the count is indicative of a number of detected peaks having peak shifts greater than the peak shift test level;
- a control circuit operable to alter the peak shift test level one or more times after establishing the count for a predetermined number of detected sample peaks, thereby generating; and
- a count associated with the predetermined number of detected sample peaks for multiple peak shift test levels, thereby generating a count distribution as a function of peak shift test levels, wherein the count distribution provides an indication of how close a read channel circuit is to experiencing peak shift errors.

31. The system of claim 26, further comprising an absolute value generator circuit operable to receive a subtraction result from the subtraction circuit and output an absolute value associated therewith.

32. A peak shift margin channel quality monitor system, comprising:
- a digital peak detector system operable to detect peaks associated with a read signal and provide a plurality of peak sample data points associated with the detected peaks;
- a comparison circuit operable to compare a value associated with two of the plurality of peak sample data points of a detected peak from the digital peak detector system which reflects a peak shift associated therewith with a peak shift test level, and output a signal indicative of whether the detected peak shift is greater or less than the peak shift test level:
- a counter circuit operable to increment a count associated therewith when the signal indicates that the detected peak shift is greater than the peak shift test level, and wherein the count is indicative of a number of detected peaks having peak shifts greater than the peak shift test level; and
- an absolute value generator circuit operable to receive a subtraction result from the subtraction circuit and output an absolute value associated therewith,
- wherein the absolute value generator circuit comprises a sign bit detector circuit operable to analyze a sign bit associated with the subtraction result and change the sign bit if the sign bit reflects a negative value.

33. A peak shift margin channel quality monitor system, comprising:
- a digital peak detector system operable to detect peaks associated with a read signal and provide a plurality of peak sample data points associated with the detected peaks;
- a comparison circuit operable to compare a value associated with two of the plurality of peak sample data points of a detected peak from the digital peak detector system which reflects a peak shift associated therewith with a peak shift test level, and output a signal indicative of whether the detected peak shift is greater or less than the peak shift test level; and a counter circuit operable to increment a count associated therewith when the signal indicates that the detected peak shift is greater than the peak shift test level, and wherein the count is indicative of a number of detected peaks having peak shifts greater than the peak shift test level, wherein the plurality of peak sample data points comprise at least three data points, wherein two of the three data points straddle a detected peak, and wherein the comparison circuit further comprises:

a subtraction circuit operable to subtract a value associated with a second data point of the three data points from a value associated with a greater value of the first and third of the three data points to generate the peak shift amplitude associated with the detected peak;

a second subtraction circuit operable to subtract the peak shift test level from the peak shift amplitude value associated with the detected peak; and a threshold detect circuit operable to generate the indication having a state which is a function of whether a subtraction result of the second subtraction circuit is positive or negative.

34. The system of claim 33, wherein the threshold detect circuit is operable to output a high digital value when the subtraction result of the second subtraction circuit is positive and a low digital value when the subtraction is negative.

* * * * *